United States Patent [19]

Terwilliger

[11] 4,338,562
[45] Jul. 6, 1982

[54] LOAD CONTROL CIRCUIT WITH TIMED INTERRUPTION

[76] Inventor: Robert D. Terwilliger, 190 Brookline St., Cambridge, Mass. 02139

[21] Appl. No.: 168,426

[22] Filed: Jul. 10, 1980

[51] Int. Cl.$^3$ .......................................... H05B 31/32
[52] U.S. Cl. .................................. 323/323; 307/141; 315/360; 323/326
[58] Field of Search ............................ 307/141, 141.4; 315/209 R, 209 SC, 360; 323/320, 322, 323, 326

[56] References Cited

U.S. PATENT DOCUMENTS

| | | | |
|---|---|---|---|
| 3,939,361 | 2/1976 | Aidala et al. | 307/141 |
| 3,973,135 | 8/1976 | Scott | 307/141 |
| 4,204,149 | 5/1980 | Cleary et al. | 323/241 |
| 4,270,058 | 5/1981 | Schornack | 315/360 X |

Primary Examiner—A. D. Pellinen
Attorney, Agent, or Firm—Wolf, Greenfield & Sacks

[57] ABSTRACT

The control circuit is preferably provided in an integral unit with a momentary on-off switch, preferably inside a switch housing box and adapted to replace a common wall switch to provide for the automatic turn-off of the light or other load operated by the switch after a presetable period of time. The circuit is constructed so as not to require a third wire (usually a power lead) at the unit. The use of low power logic circuit controls, employing preferably CMOS chips enables use of a capacitor storage element of manageable size, with very low power consumption of the circuit in its "off" state. The "on" duration of the light is adjustable over a suitable time range and the circuit is further characterized by a "flashing" period preceding total turn-off.

12 Claims, 8 Drawing Figures

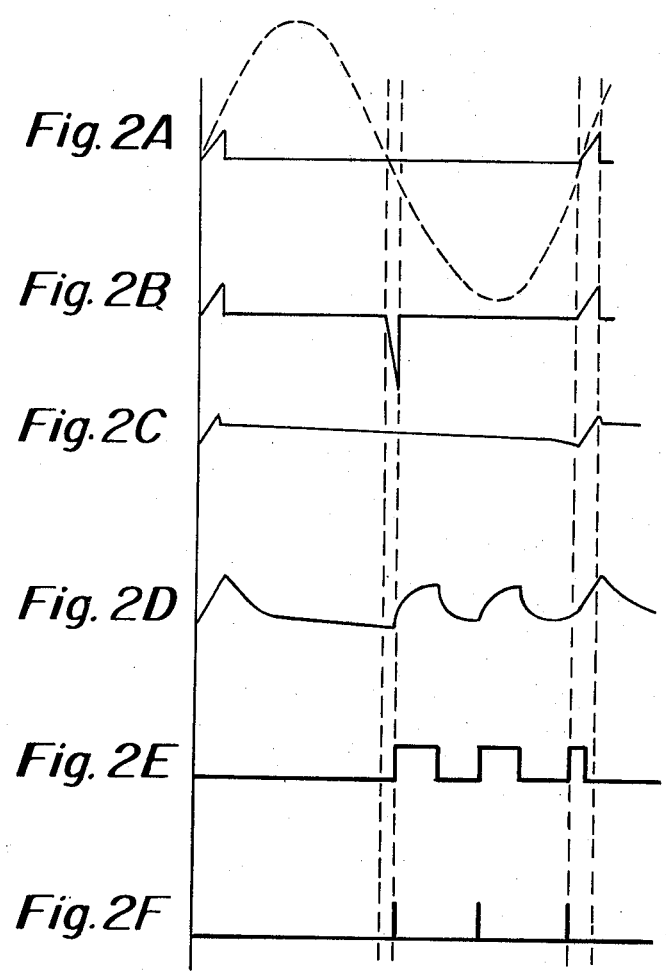
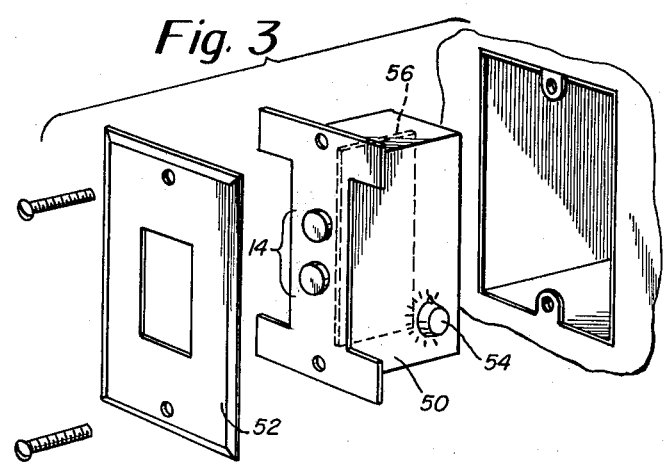

LOAD CONTROL CIRCUIT WITH TIMED INTERRUPTION

BACKGROUND OF THE INVENTION

The present invention relates in general to a control circuit for a load such as an incandescent light, and pertains, more particularly, to a very low power drain control circuit preferably adapted as a direct replacement for a conventional wall switch and which automatically turns off a previously turned-on light or other load after a presetable period of time.

Different control schemes presently exist for controlling the lights in a room. For example, some of these systems employ detectors for determining the presence of an individual in a room and will, subsequently, turn the lights on and off once the person has left the room. Usually, these forms of control are quite complex and require a special separate control box. Furthermore, substantial additional wiring is usually necessary to provide this type of control.

Other available timer systems are mechanical in nature, costly, and have non-adjustable time periods or very short "on" time periods. Also, the available timer systems do not provide any means for alerting the user such as the flashing indication described herein. This flashing indication, in accordance with the invention alerts the user that the lights are about to go out.

One of the objects of the present invention is to provide an automatic light control that is of relatively simple construction and may be readily substituted directly for the normal switch assembly. The control of this invention may be readily replaced even by an unskilled person including a homeowner in much the same way that a dimmer is easily installed where a switch used to be located.

Another object of the present invention is to provide an automatic light control circuit that can be used for automatic control even in instances were only two active wires couple to the switch.

Still another object of the present invention is to provide a light or load control circuit automatically turning lights off after a predetermined period of time, and wherein the control requires only negligible power consumption, particularly in the "off" state.

In accordance with the above objects, the present invention provides an automatic form of control that may be embodied in a relatively small unit that can be used as a direct replacement for the conventional on-off switch that is normally mounted as a wall switch, perhaps to control the lights in a room, although, the control circuit of this invention may be used for controlling other loads. In accordance with the invention, the control is totally provided in a single unit that is substituted directly for the conventional on-off switch. The control circuit is adapted for use even with a two-wire connection at the switch. Thus, not requiring a third wire or ground at the unit. This third wire is usually a power lead.

SUMMARY OF THE INVENTION

To accomplish the foregoing and other objects of this invention, there is provided a low-power consumption control circuit for controlling a load to provide for the automatic interruption of power to the load, a variable preselected period of time after load power is initiated. In the disclosed embodiment, the load is an incandescent lamp and the control circuit is adapted for use to turn the lights off in a room a pre-selected period of time after the lights have been turned on. The control in accordance with the present invention is particularly advantageous in that the control circuit is preferably a CMOS (employing FET transistors) requiring very low operating power, thus, enabling operation of the timer associated therewith with a relatively small size circuit. In accordance with the invention, the circuit is preferably constructed so as not to require a third wire at the unit. The control circuit is preferably provided in an integral unit with a double momentary on-off switch, preferably inside a switch housing box and adapted to replace a common wall switch to provide the automatic operation. The timer associated with the control circuit is preferably adjustable so as to provide different lengths of "on" time period. The control circuit also preferably provides a flashing indication at the end of the preselected time period to signal the approach of the termination of the "on" period. The unit as a whole, when installed, but with the light not illuminated, has very low current drain even though it sees full line voltage.

The control circuit disclosed herein may comprise a semiconductor switch adapted for selectively coupling power to the load, and a manually operated switch for the initiation of load-power connection. The semiconductor switch in the disclosed embodiment comprises a TRIAC, and the manually operated switch is preferably a double momentary switch. Circuit means are provided responsive to operation of said manual switch for in turn operating the semiconductor switch to its power coupling state. The circuit also includes memory means responsive to the momentary switch being moved momentarily to its on position for establishing a substantially constant operating voltage. This memory means may comprise a capacitor circuit in series with a gated semiconductor switch such as a silicon controlled rectifier responsive to operation of the momentary switch for cyclically recharging the capacitor. In addition to the memory, there is also provided a timer which may be in the form of an oscillator operated by the operating voltage and defining an "on" time period. The timer may comprise, in addition to the oscillator, a counter which is counted from the oscillator. The counter may have at least two outputs, one output for operating the semiconductor switch in a flashing mode and another output for finally terminating power to the load via the operation of the semiconductor switch. In accordance with this feature of the invention, if the time period is set to say, five minutes, then at the end of the time period, say for one minute prior to the termination of the time period, the load or incandescent lamp is operated in a flashing mode to indicate in advance the interruption of power which is to occur subsequently. The control circuit of this invention preferably employs CMOS circuitry enabling such components as the timer to be of a very low power drain. This also means that the capacitor memory can be made of a size, both as to its capacity and actual dimensions, that enable the entire circuit to be readily housed within the confines of a normal single switch housing box. Associated with the mounting box is a face plate for mounting the manual switch. One of the important features of the present invention is the fact that this entire circuit is readily adapted to replace an existing household wall switch, and is, thus, adapted for operation with only two leads including a switching leg lead and a neutral lead. Thus, there is no requirement for a separate power lead which would have to be specially coupled to the switch box. Associated with this feature of the invention is the fact that the memory preferably in the form of a capacitor is periodically charged essentially for only a portion of the AC cycle with the remaining major portion of the cycle being used for driving the load. In the disclosed embodiment the capacitor is charged for a relatively small portion of the positive going segment of the AC waveform. The preferred TRIAC for driving the load is only switched on after this small charging portion for restoring the capacitor charge. Again, this type of operation occurs on a cycling basis.

BRIEF DESCRIPTION OF THE DRAWINGS

Numerous other objects, features, and advantages of the invention should now become apparent upon a reading of the following detailed description taken in conjunction with the accompanying drawings in which:

FIGS. 2A-2F shows a series of wave forms associated with the circuit of FIG. 1; and FIG. 3 is a perspective view showing the mounting and control for the circuit of this invention.

DETAILED DESCRIPTION

Figure 1:
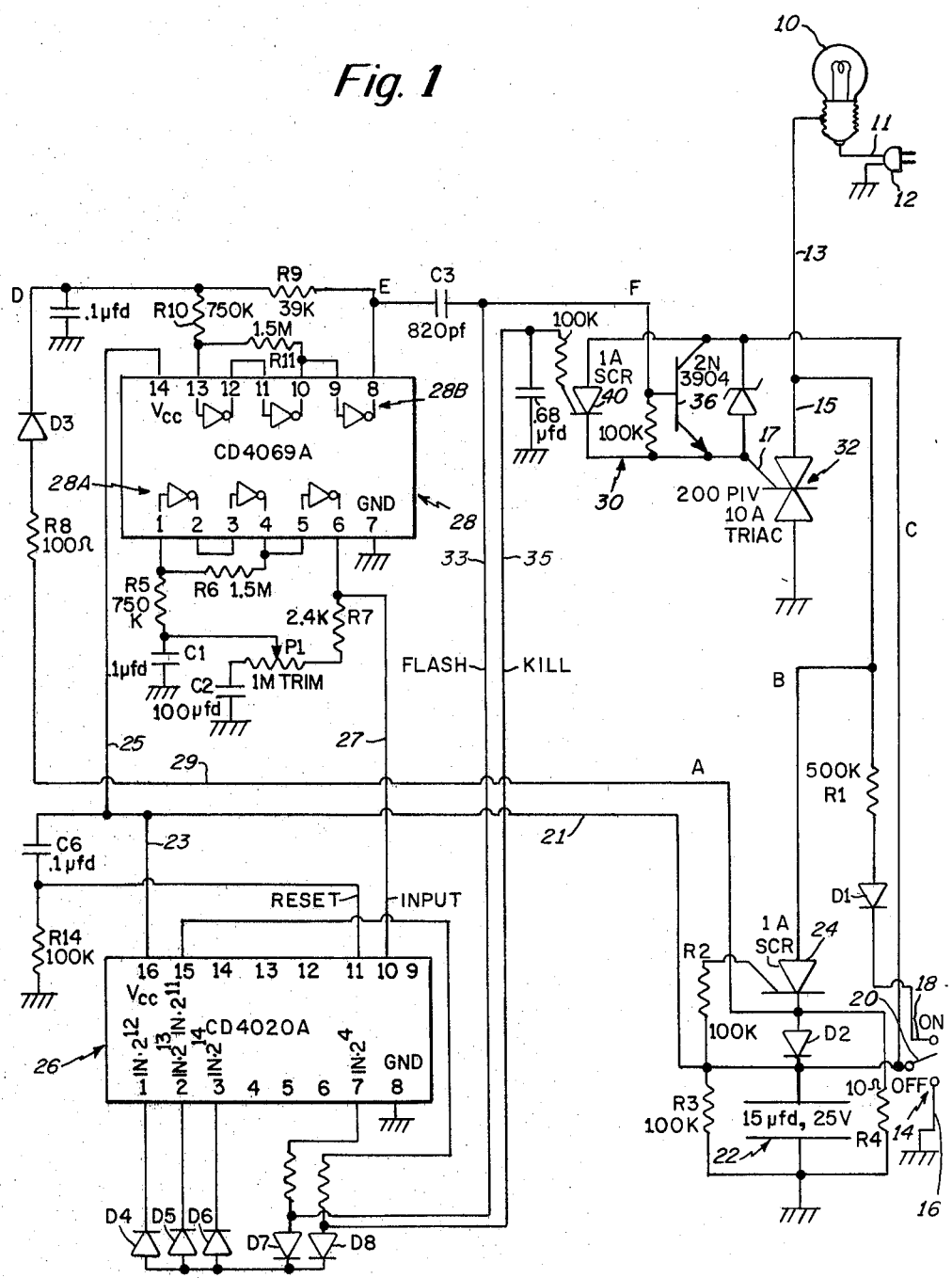
FIG. 1 is a circuit diagram of a control circuit in accordance with the present invention.

FIG. 1 is a circuit diagram showing a preferred form for the control circuit of this invention. FIG. 2 shows wave forms associated with the circuit. In FIG. 3, there is illustrated the preferred mounting arrangement of the control circuit of this invention. In the preferred embodiment described herein, the control circuit, as depicted in FIG. 1, is for controlling an incandescent lamp 10. One lead 11 couples to the AC source illustrated by way of a plug 12. In FIG. 1, the plug 12 is shown only for illustration. In an actual installation this is actually represented by a pair of 110 VAC leads in the wiring bringing power to the light fixture, switch box combination. The other lead 13 couples to the control circuit. As noted, the only other wire, in addition to lead 13, is the neutral that is provided to the circuit, illustrated here for simplicity as ground. Thus, the control circuit of this invention is readily adapted to the conventional wiring available at a switch box which typically includes only two current carrying leads; the positive or hot AC line and the switch leg lead.

FIG. 1 also shows a momentary switch 14 which is the on-off switch having lead 16 grounded, having lead 18 coupled by way of resistor R1 and diode D1 to lead 13, and having a movable contact 20. The switch 14 actually includes an intermediate normal rest position between the two "on" and "off" positions. This switch may be replaced by two separate switches, each a single pole, single throw switch as exemplified by FIG. 3. One of the switches is for "on" control while the other switch is for "off" control. In addition, the control circuit also comprises main storage capacitor 22, silicon controlled rectifier 24, binary counter 26, oscillator 28, and drive circuit 30.

The lead 13 from the incandescent lamp 10, in addition to coupling to the switch 14, also couples by way of lead 15 to the load TRIAC 32. TRIAC 32 may be a 10 amp. TRIAC controlled at its input gate 17. It is the circuit 30 that controls the input at gate 17 for controlling the firing of the TRIAC at the proper time and phase.

The circuitry associated with the SCR 24 includes gate resistor R2, resistor R3, resistor R4 and diode D2. The SCR 24 couples in series with the diode D2 and the storage capacitor 22. It is noted that the anode of SCR 24 couples to the lead 13.

The switch 14, as previously mentioned, is a momentary switch having an intermediate normal rest position and momentarily moved to its "on"0 position. When moved to its "off" position, a ground is applied to capacitor 22. However, when the switch 14 is moved to its active ("on") position, then a unidirectional signal is passed via resistor R1 and diode D1 to the capacitor 22 to cause a charging thereof. As the voltage across capacitor 22 rises, a voltage is obtained that causes a firing of the SCR 24 on the next positive AC cycle. The SCR, in effect, forms a latch for maintaining the capacitor charged even though the momentary switch is subsequently released.

The series of waveforms shown in FIGS. 2A-2F are identified as waveforms A through F. The same designation is also shown on the circuit diagram of FIG. 1. Thus, waveform A represents the voltage at the cathode of SCR 24 when the switch is activated. Waveform B represents the voltage at the anode of SCR 24. Waveform C represents the voltage across capacitor 22. It can be seen that the voltage across the capacitor is maintained relatively uniform with there being only a slight discharge no greater than a thirty percent discharge between cycles. This relatively constant voltage is essentially used as a normal positive power voltage for driving the CMOS logic that is described including the counter 26 and the device 28. FIG. 1 shows the lead 21 coupling from the capacitor 22 and branching into a lead 23 for providing power to the device 28. The counter 26 may be type CD4020A while the device 28 may be type CD4069A. The device 28 actually comprises a pair of circuits each including a series of inverters that may be intercoupled to provide different functions. The counter 26 is part of the primary timer for determining the predetermined period of time that the incandescent lamp will be illuminated.

When power is applied by way of lead 25 to the power input pin 14, the device 28 is then in operation. The device 28 actually includes sections 28A and 28B. Section 28B is connected as a half-cycle delay circuit whereas section 28A is connected as an oscillator. The half-cycle delay circuit is for delaying the pulsing of the TRIAC for the negative portion of the TRIAC operation to provide load conduction in both positive and negative portions of the cycle. The other components associated with the oscillator 28A include resistors R5, R6 and R7, capacitors C1 and C2, and potentiometer P1. As soon as power is applied to the oscillator, it commences operation sending a periodic pulse signal by way of lead 27 to the clock input of the counter 26. Thus, the counter 26 is counted from the oscillator at a rate dependent upon the setting of the potentiometer P1. The outputs taken from the counter are in a sense fixed and, thus, the duration of the "on" time of the control circuit is controlled predominantly by the setting of the potentiometer P1 which, in turn, controls the frequency of clock signals coupled by way of the lead 27 to the clock input of the counter 26.

The cathode voltage shown in FIG. 2A is coupled by way of lead 29 to resistor R8 and diode D3. Waveform 2D shows the voltage at the cathode of the diode D3. The waveform in FIG. 2E represents the voltage at the node between resistor R9 and capacitor C3. The section 28B of the device 28 intercouples with resistors R10 and R11 along with the previously mentioned resistor R9. The section 28B, along with these components, forms a type of delay circuit which employs a positive pulse at point D to reset an RC timer. This timer is set for one-half of the AC cycle (about 8 msec). If the load is illuminated in the positive phase of the AC cycle, when the negative phase comes up, a spike is coupled to a transistor 36 to cause negative conduction of the TRIAC. FIG. 2F depicts the voltage pulse at the base of the transistor 36. The pulsing of transistor 36 in turn causes a gate pulse to be coupled to the input gate 17 of the TRIAC 32. When the momentary switch is operated, the TRIAC 32 is caused to the conducted in both phases of the AC signal, causing continuous illumination of the incandescent lamp 10.

As previously mentioned, the counter 26 is counted from the oscillator pulses on line 27 to the clock input of the counter. FIG. 1 shows the series of outputs from the counter coupling to diodes D4–D8. These diodes in essence form a decoder for sensing certain outputs from the counter. Two important leads from the counter are taken at the anodes of D7 and D8. These include leads 33 and 35. Lead 33 couples to the base of transistor 36 while lead 35 couples into the gate input of SCR 40. The signal on line 33, as discussed hereinafter, will cyclically disable the ability of the section 28B to trigger TRIAC 32 on the negative phase of the line voltage thus creating the flashing indication.

The output to lead 33 occurs at a lower count than the output to lead 35. By way of example, the counter outputs may be set so that the output on lead 33 occurs say, four minutes after the initiation of the counting. The output on lead 35 may occur at the five or six-minute period. The early count on lead 33 is adapted to provide a flashing sequence at a rate determined by the frequency on lead 33. For example, the flashing may occur at a four or five-second rate. This flashing is occasioned by periodic interruption of the conduction of transistor 36 so as to inhibit TRIAC operation. This occurs in an on-off sequence as set by the frequency of the signal on lead 33. This flashing actually occurs by virtue of inhibiting the negative portion of the cycle by way of the delay section 28B so that the interruption of the flash is occasioned essentially by a half-wave rectification.

After this "flashing" interval, there is a signal on lead 35 coupled to the gate input of SCR40 for turning this SCR on, thus clamping the voltage across the transistor 36 and causing immediate TRIAC conduction via gate electrode 17. The TRIAC turns on and this action, in turn, ceases the coupling of any power to the capacitor 22. All power is coupled to the TRIAC 15. There is thus a discharge of capacitor 22 with the capacitor no longer being refreshed and there is thus an end of operation as the primary logic circuit power represented by capacitor 22 has now been removed. The reset circuit includes capacitor C6 and resistor R14. This resetting action returns the counter to a zero count in readiness for subsequent operation which will occur when the momentary switch is again moved to its "on" position.

As mentioned previously, the CMOS logic enables use of a relatively small-size capacitor 22. This, thus, makes it possible to house the entire circuit in the conventional switch housing 50 shown in FIG. 3. FIG. 3 also shows the face plate 52 having associated therewith the momentary switch 14 also referred to in FIG. 1. FIG. 3 also shows the control knob 54 which couples to the potentiometer P1 of FIG. 1. The control knob 54 is for adjusting the duration of the "on" time period. This control knob is preferably not accessible on the outside of the face plate but is made as a setting, at the time of installation in the wall, although, for some applications it could possibly be mounted for use by the consumer. For most normal operations, it is desired that the control knob be adjusted, by the landlord, parents, or building owner, and not exposed when the unit is mounted. FIG. 3 also shows a printed circuit board 56 from which the switch may be mounted. The printed circuit board is for mounting the components depicted in FIG. 1. The entire package is readily fitted within the switch housing and can be used as a direct replacement for the conventional wall switch.

Having described one embodiment of the present invention, it is now apparent that numerous other embodiments are contemplated as falling within the scope of this invention. For example, there has been described a load in the form of an incandescent lamp. Other forms of load may also be adapted for use with the control circuit of the present invention. Also, one preferred form of logic is CMOS logic, although, other equivalent low power logic circuits may also be employed, preferably those employing FET transistors for low power drain. A flashing indication has been shown as a preferred means for signalling the approach of the termination of the "on" period of the timer. However, this visual indication could also be replaced by an audible indication of some other type of dimming indication, although the visual flashing arrangement is preferred. Actually, in accordance with the operation of the present invention, when the flashing indication does occur and when the occupant of the room wishes to maintain the lights on, then the operator simply has to, in the embodiment of FIG. 1, activate the switch to its off position and follow this by movement to the on position and to then reset the circuit for a further time period. Also disclosed herein is a technique wherein the capacitor is periodically recharged for a relatively small portion of the cycle. This is depicted in FIGS. 2A and 2B as only a relatively a small portion of the positive section of the AC waveform. In another embodiment this duration could be somewhat longer but is preferably not the major portion of the positive section as this could then create an undesirable flashing signal for continuous operation.

What is claimed is:

1. A lower power consumption control circuit for controlling a load to provide for automatic interruption of power to the load a preselected period of time after load power is initiated, comprising;

a semiconductor switch adapted for selectively coupling power to the load, a manually operated switch for initiation of load power, means responsive to said manual switch moved to its operating position for, in turn, operating said semiconductor switch to its power coupling state, memory means responsive to said manual switch moved to its operating position for establishing an operating voltage, said memory means comprising a capacitor, a timer operated by said operating voltage and defining an "on" time period, means responsive to said timer and termination of said time period for operating said semiconductor switch to uncouple power to the load, a gated semiconductor electronic switch coupled in series with said memory capacitor, one side of said load being connected in series with said semiconductor switch and also in series with the capacitor, said gated semiconductor electronic switch including means responsive to the voltage across said capacitor for controlling the delivery of power to said capacitor when needed but only for a minor portion of the voltage swing delivered to the load to thereby cyclically recharge the capacitor, the remainder of the power of the voltage swing being delivered directly to the load.

2. A control circuit as set forth in claim 1 wherein said semiconductor switch comprises a TRIAC.

3. A control circuit as set forth in claim 2 wherein said manually operated switch comprises a momentary switch.

4. A control circuit as set forth in claim 1 wherein said timer comprises an oscillator set into operation when the manual switch is operated, and a counter counted from the oscillator.

5. A control circuit as set forth in claim 4 wherein said counter has at least two outputs, one output for operating the semiconductor switch in a flashing mode and another output for interrupting power to the load via the semiconductor switch.

6. A control circuit as set forth in claim 5 wherein the one output is a lower count output than the other output to provide a flashing load condition prior to load interruption.

7. A control circuit as set forth in claim 1 including means for adjusting the "on" time period.

8. A control circuit as set forth in claim 1 including means coupling AC power to the memory means to periodically refresh it.

9. A control circuit as set forth in claim 1 including means responsive to a timer signal prior to the end of the "on" period for providing a sensory signal distinguishable from the load on signal to indicate approach of the end of the "on" period.

10. A control circuit as set forth in claim 9 wherein the sensory signal is visual.

11. A control circuit as set forth in claim 9 wherein the signal is the flashing of the load.

12. A control circuit as set forth in claim 10 wherein the signal is the flashing of the load.

* * * * *